(12) United States Patent
Nagao

(10) Patent No.: US 11,656,516 B2
(45) Date of Patent: May 23, 2023

(54) LIGHT ADJUSTMENT DEVICE

(71) Applicant: Japan Display Inc., Tokyo (JP)

(72) Inventor: Koichi Nagao, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 17/707,066

(22) Filed: Mar. 29, 2022

(65) Prior Publication Data

US 2022/0317531 A1    Oct. 6, 2022

(30) Foreign Application Priority Data

Mar. 31, 2021    (JP) .............................. JP2021-061105

(51) Int. Cl.
*G02F 1/13*    (2006.01)
*G02F 1/1362*  (2006.01)
*G02F 1/1365*  (2006.01)

(52) U.S. Cl.
CPC ...... *G02F 1/136286* (2013.01); *G02F 1/1365* (2013.01)

(58) Field of Classification Search
CPC .................................................... G02F 1/1362
See application file for complete search history.

(56) References Cited

U.S. PATENT DOCUMENTS

| 2014/0098305 A1* | 4/2014 | Mo | ........................ G06F 3/0446 349/12 |
| 2015/0254491 A1* | 9/2015 | Mo | .......................... G06F 3/044 345/174 |
| 2019/0331955 A1* | 10/2019 | Lee | ..................... G02F 1/13476 |

FOREIGN PATENT DOCUMENTS

| CN | 101995676 | * | 3/2011 | ............... G02F 1/13 |
| JP | 2004-333567 A | | 11/2004 | |

* cited by examiner

*Primary Examiner* — Sang V Nguyen
(74) *Attorney, Agent, or Firm* — Michael Best & Friedrich LLP

(57) ABSTRACT

According to an aspect, a light adjustment device includes: a panel unit in which a plurality of light adjustment panels are stacked in a first direction, the light adjustment panels each including a first substrate and a second substrate, the first substrate including at least two terminal groups each including a plurality of terminals that are capable of being coupled to one flexible printed circuit board, the second substrate overlapping with the first substrate; and a plurality of flexible printed circuit boards each of which is coupled to one of the terminal groups of a corresponding one of the light adjustment panels. A plurality of the terminal groups are arranged in a second direction intersecting the first direction when the panel unit is viewed in the first direction, and the flexible printed circuit boards do not overlap with one another when viewed in the first direction.

12 Claims, 17 Drawing Sheets

FIG.2
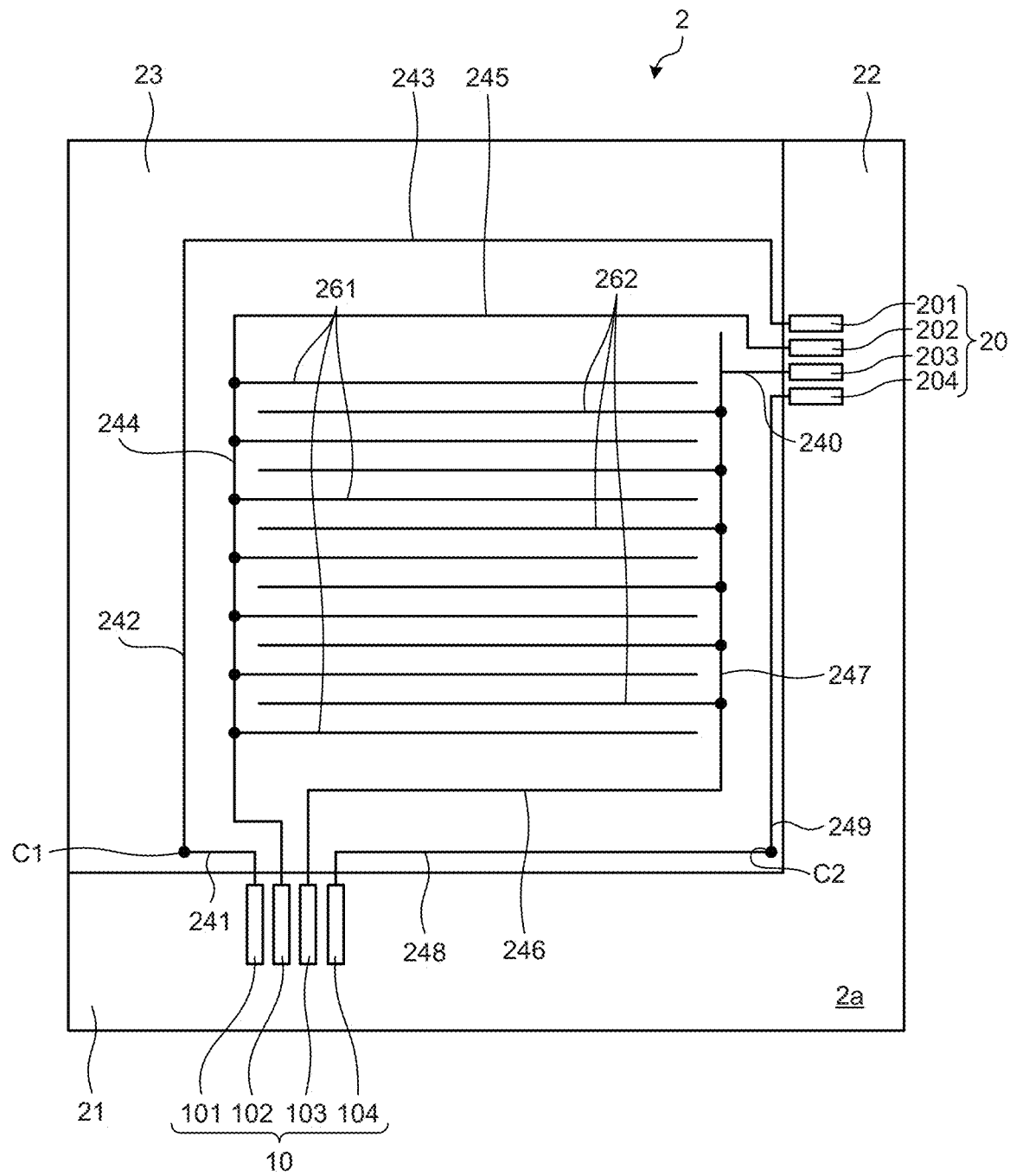
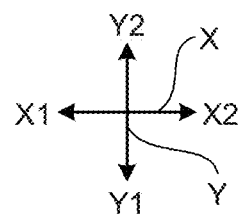

FIG.3
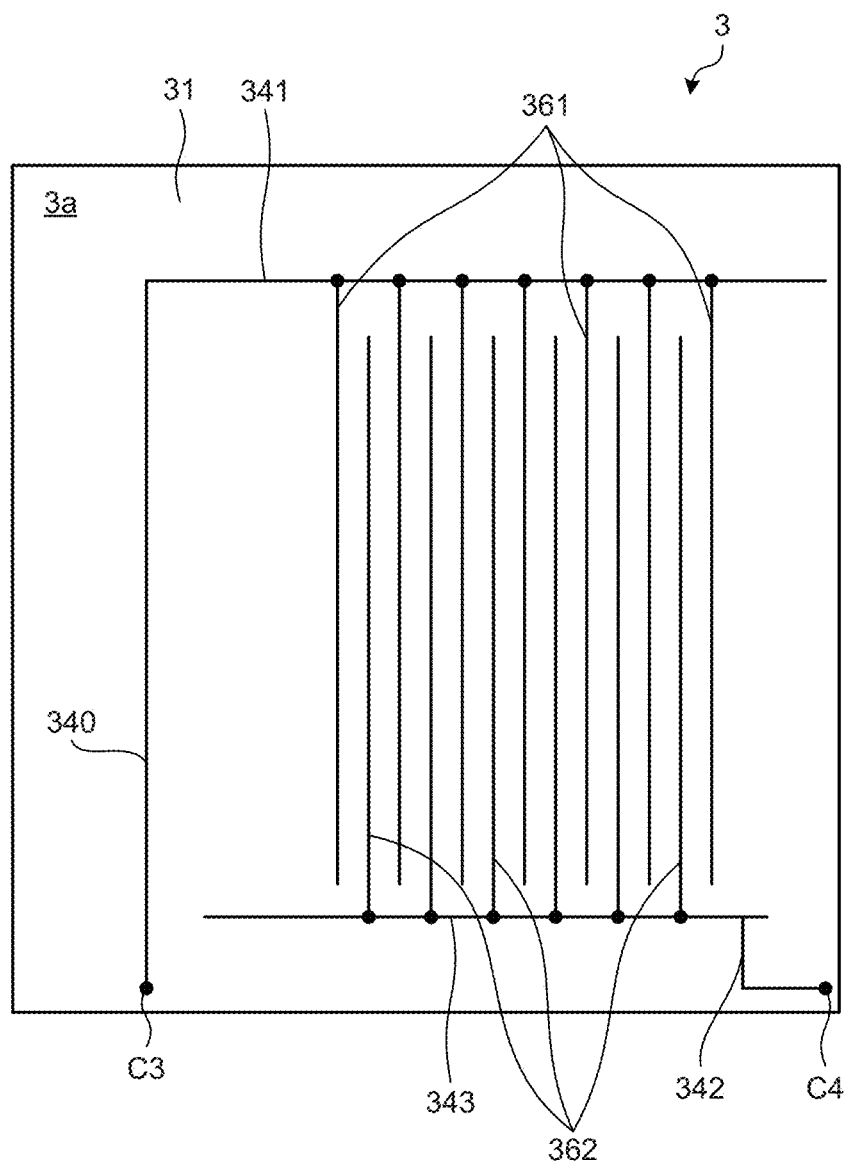
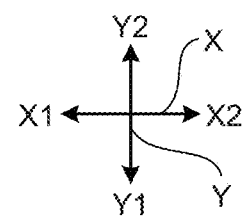

FIG.4
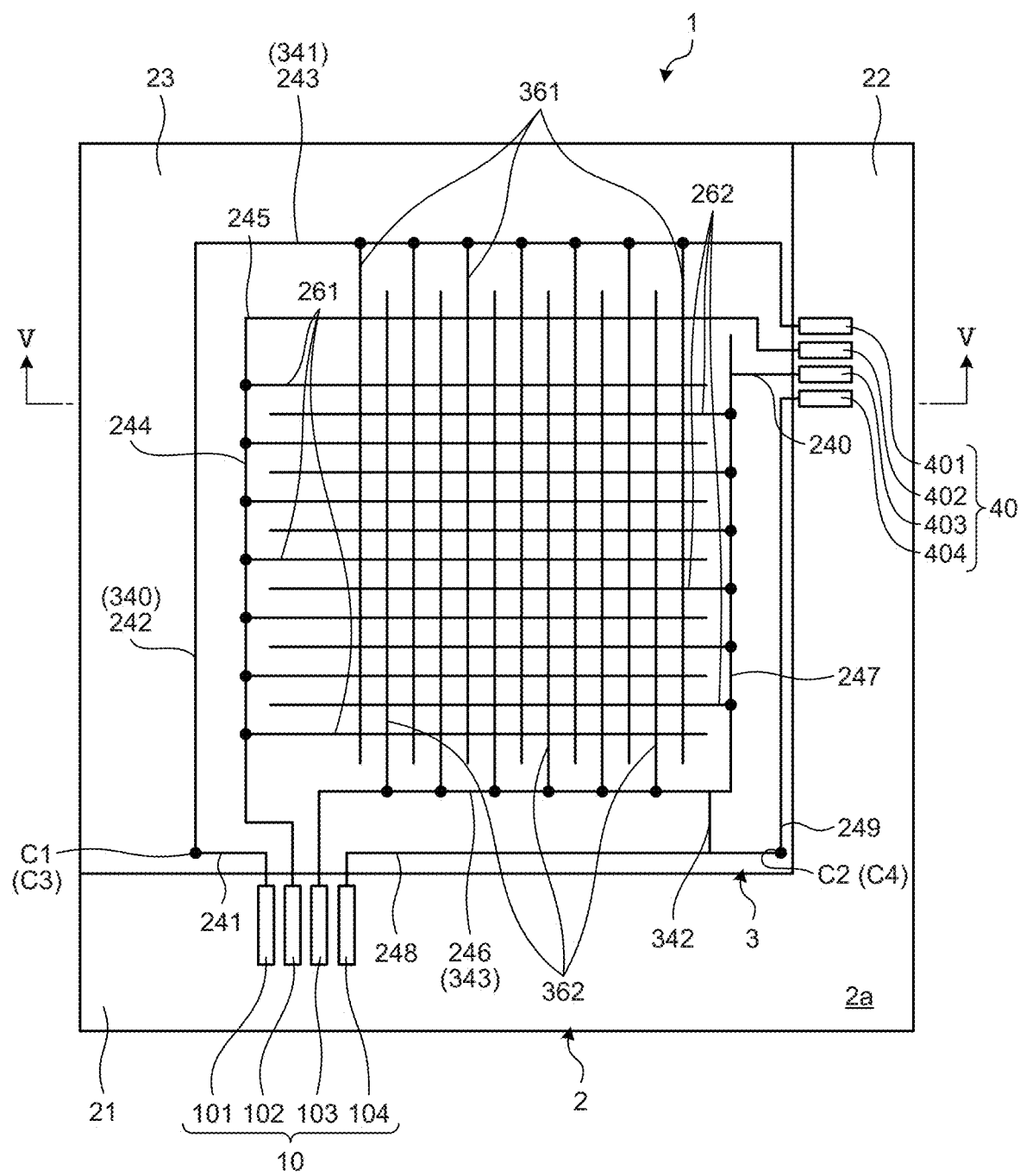
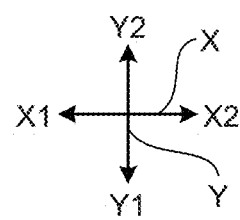

FIG.5
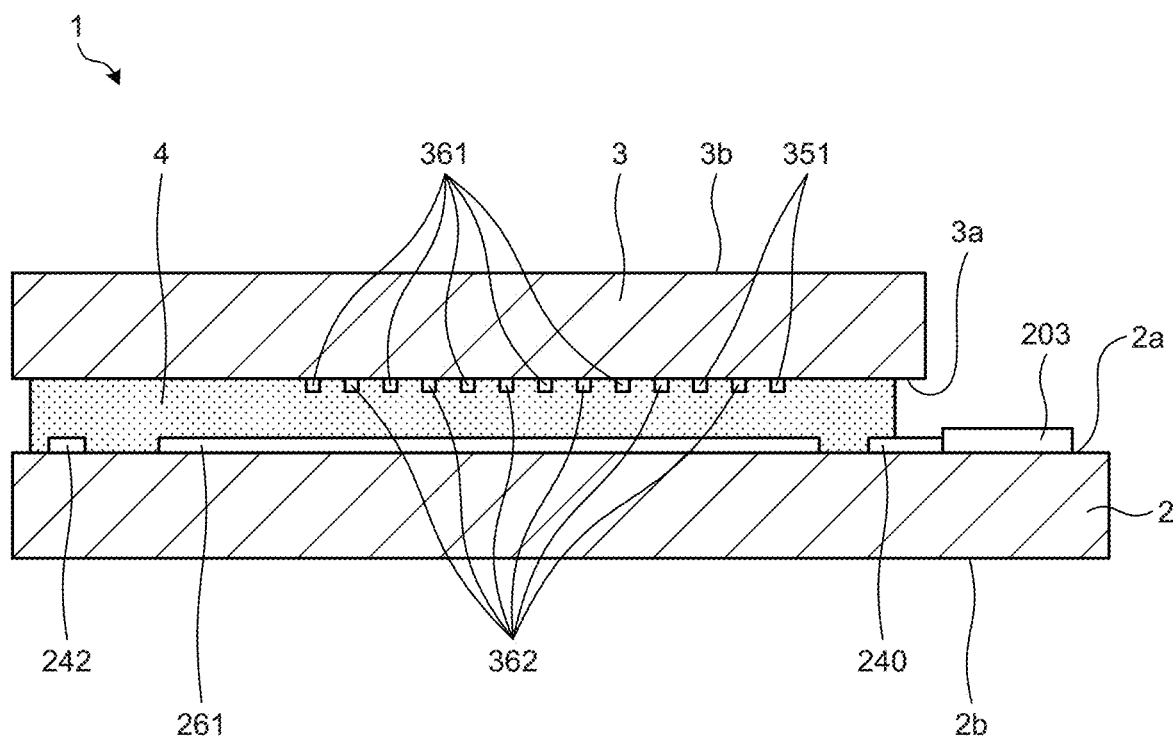
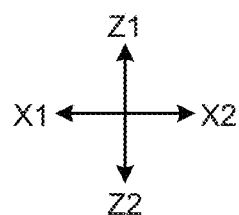

FIG.6
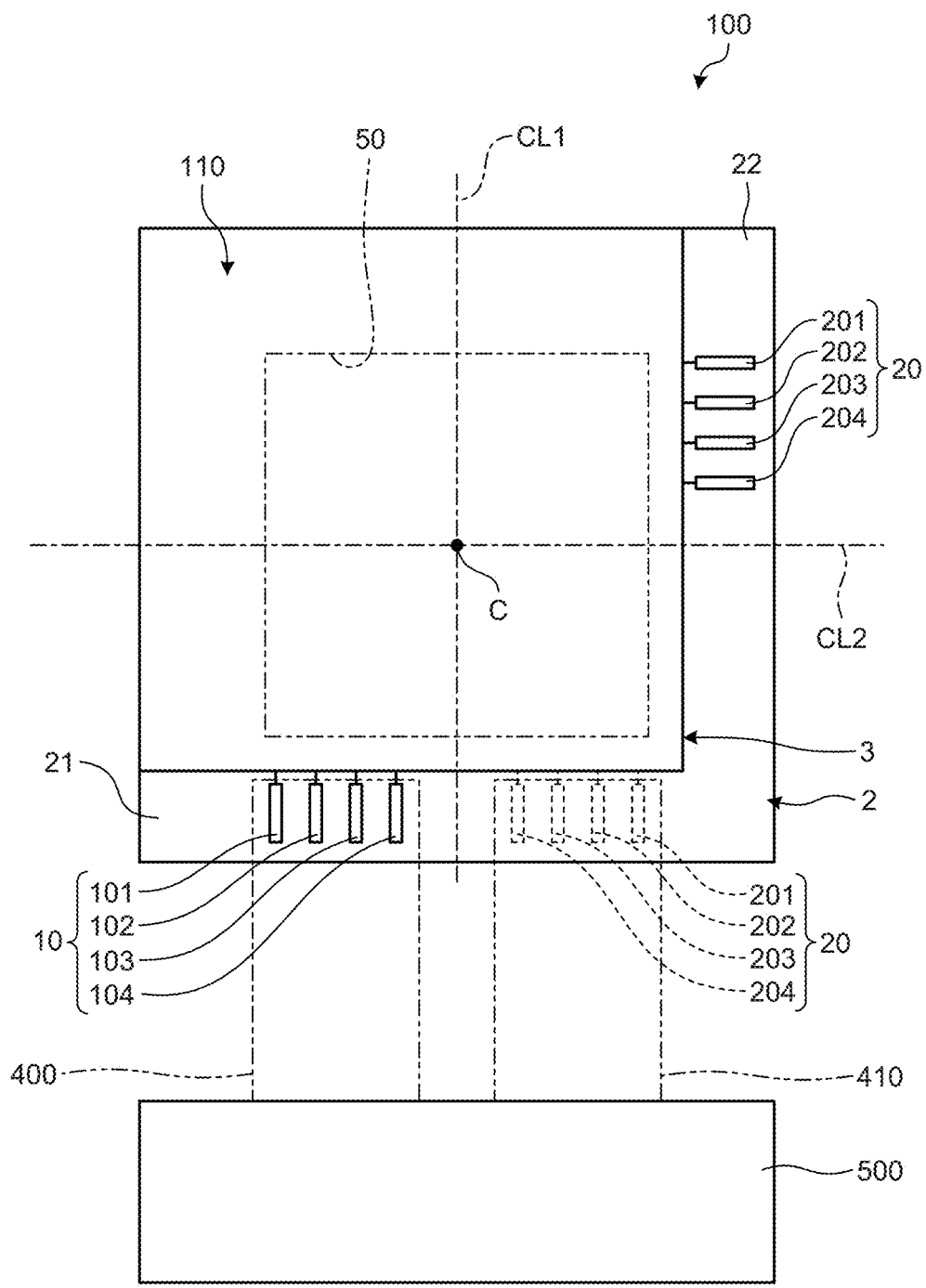
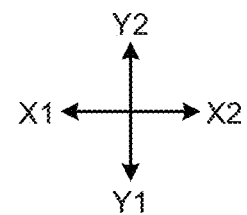

FIG.10
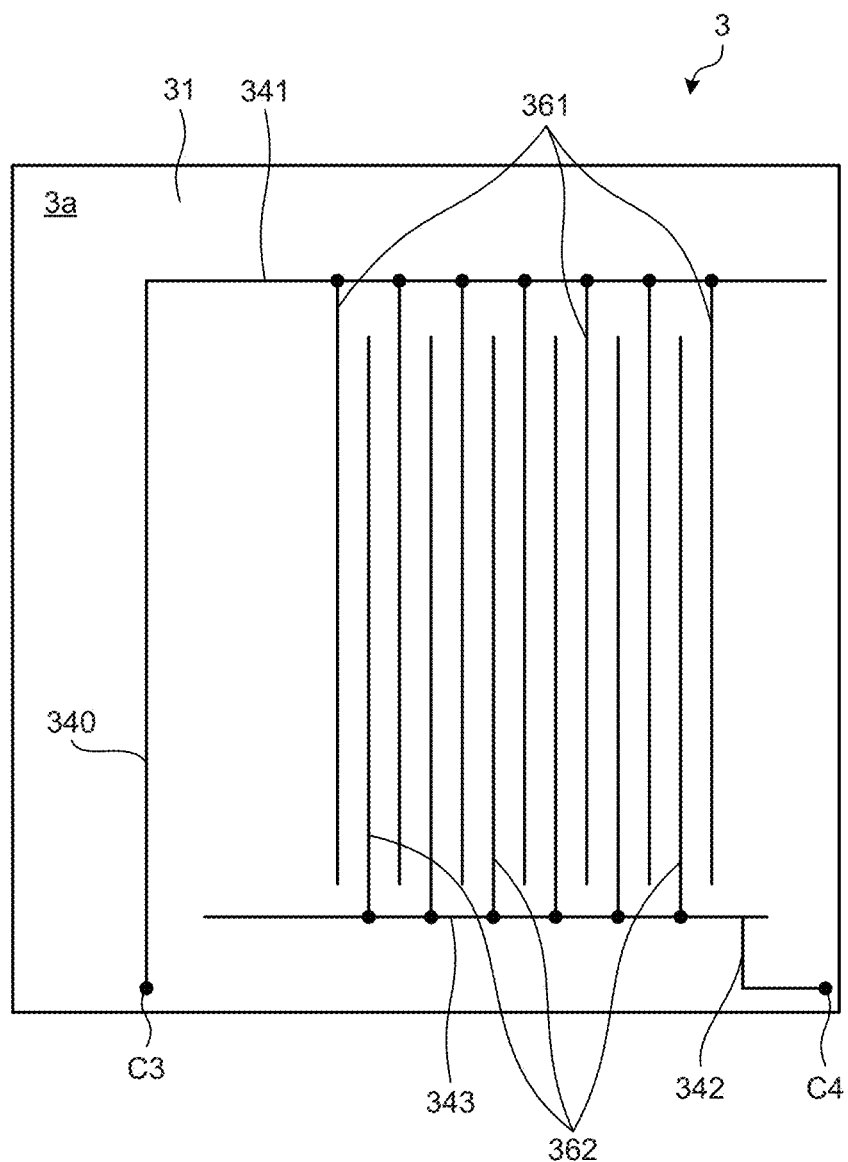
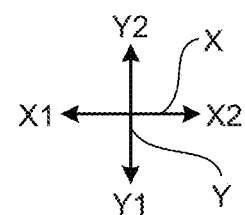

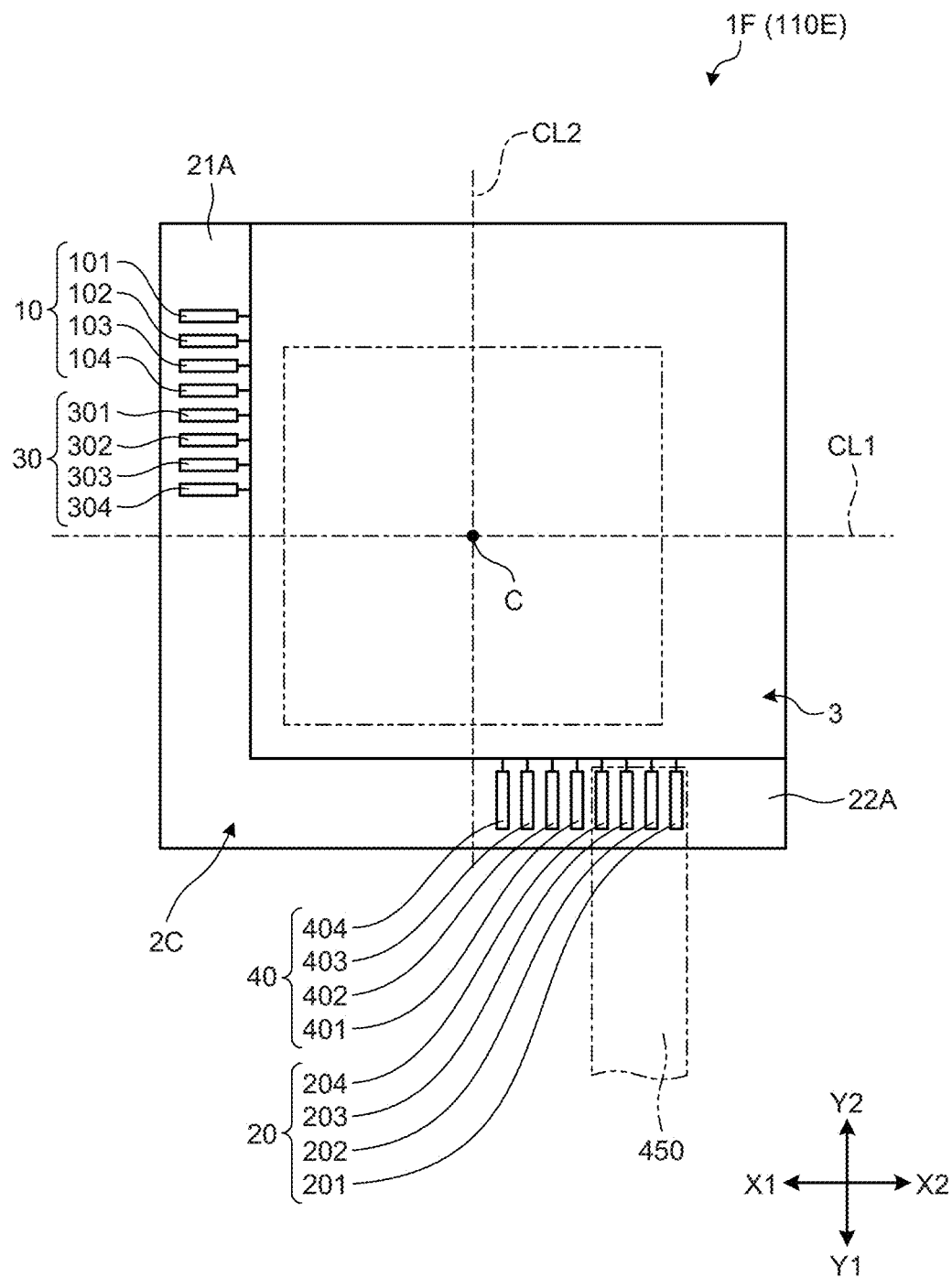

LIGHT ADJUSTMENT DEVICE

CROSS-REFERENCE TO RELATED APPLICATION

This application claims the benefit of priority from Japanese Patent Application No. 2021-061105 filed on Mar. 31, 2021, the entire contents of which are incorporated herein by reference.

BACKGROUND

1. Technical Field

What is disclosed herein relates to a light adjustment device.

2. Description of the Related Art

A light adjustment device of Japanese Patent Application Laid-open Publication No. 2004-333567 includes a light adjustment panel. The light adjustment panel includes a plurality of substrates and a liquid crystal layer sealed between the substrates. When incident light enters the light adjustment panel, the optical transmittance of the incident light is adjusted by the light adjustment panel, and transmitted light thus adjusted is output from the light adjustment device.

It is desired to reduce the number of printed circuit boards when a plurality of light adjustment panels are stacked and each coupled to a printed circuit board through a flexible printed circuit board.

For the going reasons, there is a need for a light adjustment device that enables reduction of the number of printed circuit boards when a plurality of stacked light adjustment panels are each coupled to a printed circuit board through a flexible printed circuit board.

SUMMARY

According to an aspect, a light adjustment device includes: a panel unit in which a plurality of light adjustment panels are stacked in a first direction, the light adjustment panels each including a first substrate and a second substrate, the first substrate including at least two terminal groups each including a plurality of terminals that are capable of being coupled to one flexible printed circuit board, the second substrate overlapping with the first substrate; and a plurality of flexible printed circuit boards each of which is coupled to one of the terminal groups of a corresponding one of the light adjustment panels. A plurality of the terminal groups are arranged in a second direction intersecting the first direction when the panel unit is viewed in the first direction, and the flexible printed circuit boards do not overlap with one another when viewed in the first direction.

BRIEF DESCRIPTION OF THE DRAWINGS

FIG. 2 is a schematic diagram of an array substrate according to the first embodiment when viewed from above;

FIG. 3 is a schematic diagram of a counter substrate according to the first embodiment when viewed from above;

FIG. 4 is a schematic diagram of a light adjustment panel according to the first embodiment when viewed from above;

FIG. 5 is a sectional view taken along line V-V in FIG. 4;

FIG. 6 is a schematic diagram of the light adjustment device according to the first embodiment when viewed from above;

FIG. 10 is a schematic diagram of a counter substrate according to the second embodiment when viewed from above;

FIG. 17 is a schematic diagram of a light adjustment panel stacked fourth on the upper side in the light adjustment device in FIG. 13 when viewed from above.

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

In this disclosure, when an element is described as being "on" another element, the element can be directly on the other element, or there can be one or more elements between the element and the other element.

Figure 1:
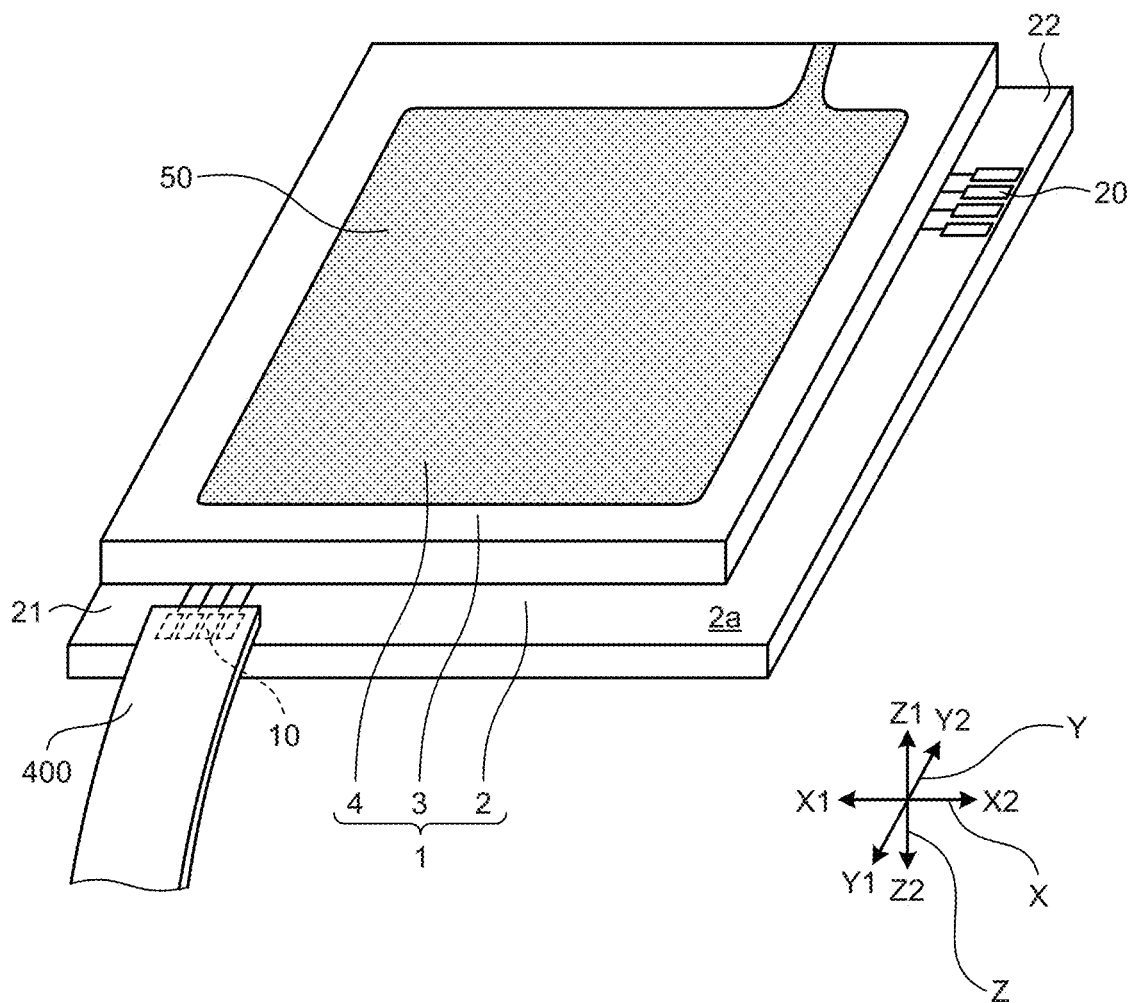
FIG. 1 is a perspective view of a light adjustment device according to a first embodiment.
Figure 7:
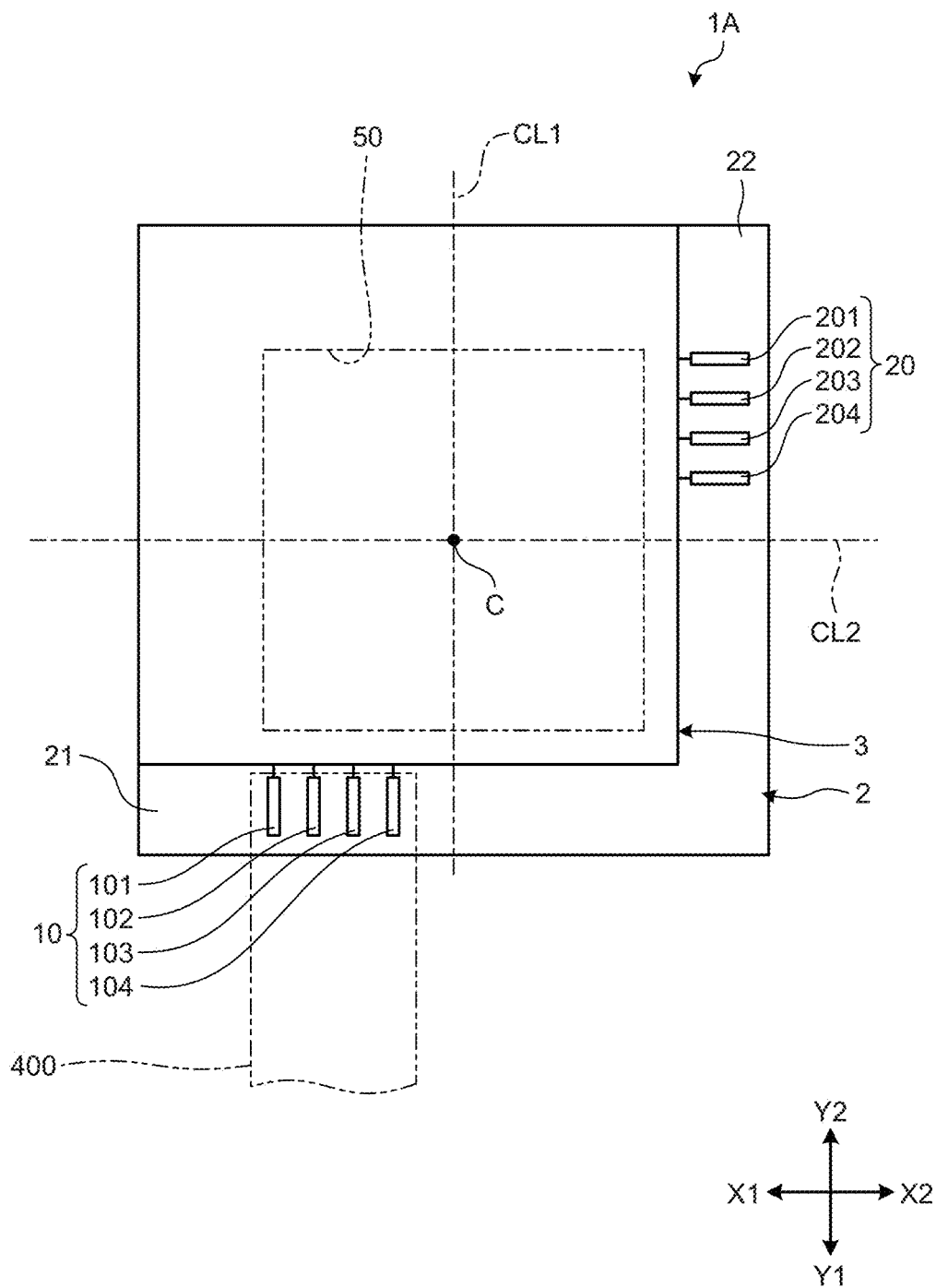
FIG. 7 is a schematic diagram of a light adjustment panel stacked on the upper side in the light adjustment device in FIG. 6 when viewed from above.
Figure 8:
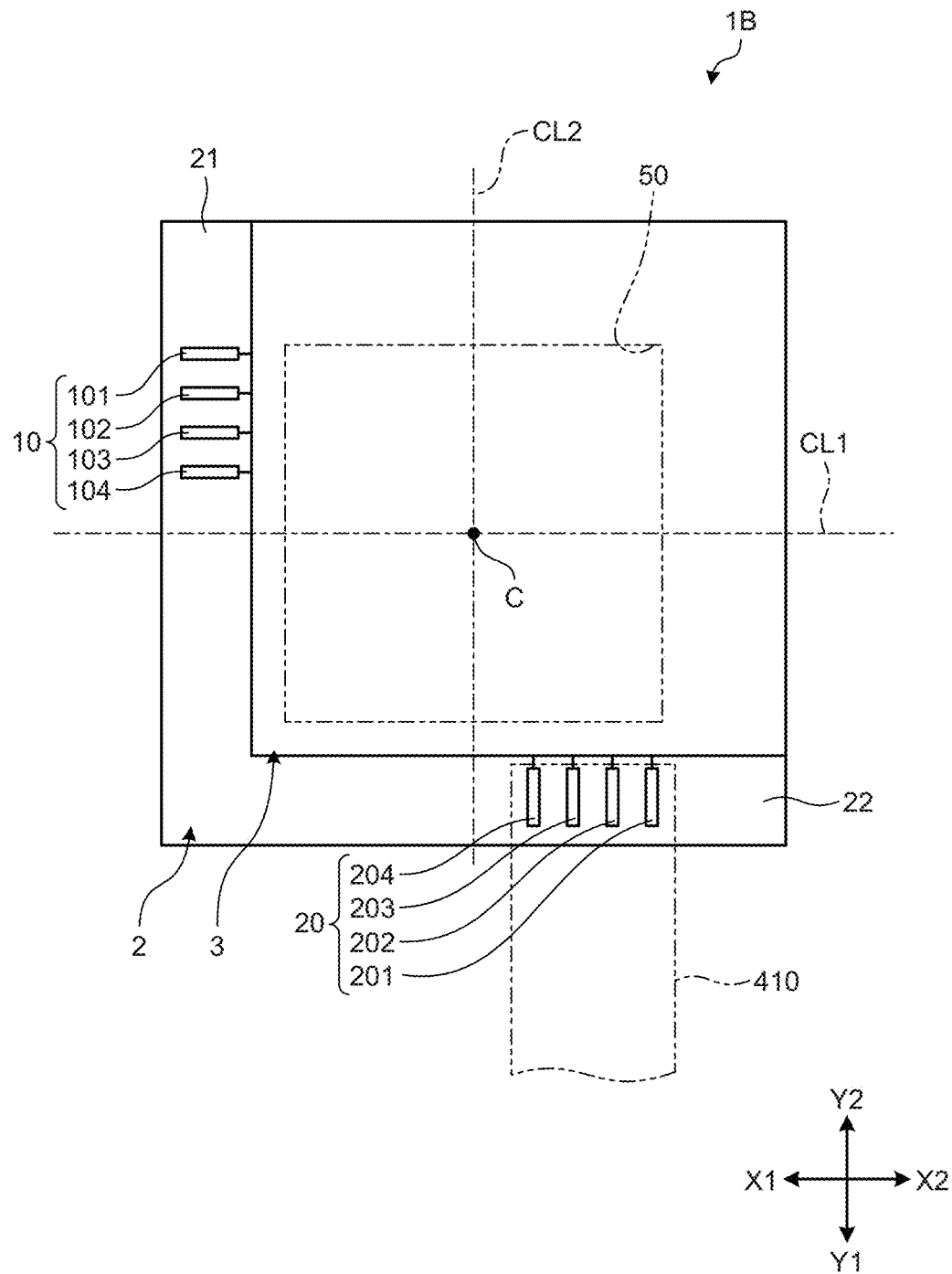
FIG. 8 is a schematic diagram of a light adjustment panel stacked on the lower side in the light adjustment device in FIG. 6 when viewed from above.

FIG. 1 is a perspective view of a light adjustment device according to a first embodiment. FIG. 2 is a schematic diagram of an array substrate according to the first embodiment when viewed from above. FIG. 3 is a schematic diagram of a counter substrate according to the first embodiment when viewed from above. FIG. 4 is a schematic diagram of a light adjustment panel according to the first embodiment when viewed from above. FIG. 5 is a sectional view taken along line V-V in FIG. 4. FIG. 6 is a schematic diagram of the light adjustment device according to the first embodiment when viewed from above. FIG. 7 is a schematic diagram of a light adjustment panel stacked on the upper side in the light adjustment device in FIG. 6 when viewed from above. FIG. 8 is a schematic diagram of a light adjustment panel stacked on the lower side in the light adjustment device in FIG. 6 when viewed from above.

In an XYZ coordinate system illustrated in the drawings, an X direction is a right-left direction, and an X1 direction and an X2 direction are opposite to each other. The X1 direction is also referred to as a left direction, and the X2 direction is also referred to as a right direction. A Y direction is the front-back direction, and a Y1 direction and a Y2 direction are opposite to each other. The Y1 direction is also referred to as a front direction, and the Y2 direction is also referred to as a back direction. A Z direction is an up-down direction (stacking direction). A Z1 direction and a Z2 direction are opposite to each other. The Z1 direction is also referred to as an up direction, and the Z2 direction is also referred to as a down direction. The Z direction is also referred to as a first direction, and the X direction is also referred to as a second direction. The first direction and the second direction are orthogonal to (intersect) each other.

First Embodiment

First, a first embodiment will be described below. FIG. 1 is a perspective view of a light adjustment panel according to the first embodiment. FIG. 2 is a schematic diagram of an array substrate according to the first embodiment when viewed from above. FIG. 3 is a schematic diagram of a counter substrate according to the first embodiment when viewed from above. FIG. 4 is a schematic diagram of the light adjustment panel according to the first embodiment when viewed from above. FIG. 5 is a sectional view taken along line V-V in FIG. 4.

As illustrated in FIG. 1, a light adjustment panel 1 according to the first embodiment is electrically coupled to a flexible printed circuit (FPC) board 400. The light adjustment panel 1 includes an array substrate (first substrate) 2, a counter substrate (second substrate) 3, and a liquid crystal layer 4. An insulating layer is provided to prevent contact between two wiring lines. In the first embodiment, as described later with reference to FIG. 2, the array substrate (first substrate) 2 does not have a part where wiring lines overlap and thus is provided with no insulating layer.

As illustrated in FIGS. 1 and 4, the array substrate (first substrate) 2 is larger than the counter substrate (second substrate) 3. That is, the area of the counter substrate (second substrate) 3 is smaller than the area of the array substrate (first substrate) 2. The array substrate 2 includes a transparent glass 23 (refer to FIG. 2). The counter substrate 3 includes a transparent glass 31 (refer to FIG. 3). In the first embodiment, the array substrate 2 and the counter substrate 3 have square shapes in plan view from above, but the shapes of substrates according to the present invention are not limited to square shapes. In plan view from above, an end of the counter substrate 3 on the X1 side is provided at substantially the same position in the X direction as that of an end of the array substrate 2 on the X1 side, and an end of the counter substrate 3 on the Y2 side is provided at substantially the same position in the Y direction as that of an end of the array substrate 2 on the Y2 side. Consequently, an end part of a front surface 2a of the array substrate 2 on the Y1 side and an end part of the front surface 2a of the array substrate 2 on the X2 side are exposed.

In other words, the front surface 2a of the array substrate 2 includes a first area (first side) 21 and a second area (second side) 22, and the first area 21 and the second area 22 are exposed. The first area 21 and the second area 22 are orthogonal to (intersect) each other. The first area (first side) 21 is positioned at the end part of the front surface 2a of the array substrate 2 on the Y1 side and extends in the X direction. The second area (second side) 22 is positioned at the end part of the front surface 2a of the array substrate 2 on the X2 side and extends in the Y direction. The first area (first side) 21 and the second area 22 form an L shape when viewed from above. A first terminal group 10 is disposed in the first area (first side) 21, and a second terminal group 20 is disposed in the second area (second side) 22. The first terminal group 10 and the second terminal group 20 are exposed since the area of the counter substrate 3 is smaller than that of the array substrate 2 in the light adjustment panel 1.

As illustrated in FIGS. 2 and 4, the first terminal group 10 includes a first terminal 101, a second terminal 102, a third terminal 103, and a fourth terminal 104. The first terminal 101, the second terminal 102, the third terminal 103, and the fourth terminal 104 are sequentially arranged from the X1 side toward the X2 side in the right-left direction (X direction). The first terminal group 10 is electrically coupled to the flexible printed circuit board 400 as illustrated with a dashed and double-dotted line in FIG. 6 and other figures.

As illustrated in FIGS. 2 and 4, the second terminal group 20 includes a fifth terminal 201, a sixth terminal 202, a seventh terminal 203, and an eighth terminal 204. The fifth terminal 201, the sixth terminal 202, the seventh terminal 203, and the eighth terminal 204 are sequentially arranged from the Y2 side toward the Y1 side in the front-back direction (Y direction).

As illustrated in FIG. 1, the counter substrate 3 is disposed on the upper side (Z1 side) of the array substrate 2. The liquid crystal layer 4 is provided between the counter substrate 3 and the array substrate 2. An active region 50 (refer to the active region 50 in FIG. 6 and other figures) is a region in which the liquid crystal layer 4 is provided, a frame region is a region outside the liquid crystal layer 4, and the first area 21 and the second area 22 are terminal regions.

Next, wiring lines of the array substrate 2 and the counter substrate 3 will be described below. As illustrated in FIG. 5, wiring lines are provided on the front surface of each substrate, among the front and back surfaces thereof. In other words, a surface on which wiring lines are provided is referred to as the front surface, and a surface opposite to the front surface is referred to as the back surface. Specifically, as illustrated in FIG. 5, wiring lines are provided on the front surface 2a on the upper side among the front surface 2a and a back surface 2b of the array substrate 2, and wiring lines are provided on a front surface 3a on the lower side among the front surface 3a and a back surface 3b of the counter substrate 3. In this manner, the array substrate 2 and the counter substrate 3 are disposed so that the front surface 2a and the front surface 3a face each other with the liquid crystal layer 4 interposed therebetween. The wiring lines of the array substrate 2 and the wiring lines of the counter substrate 3 are supplied with, for example, alternating current (AC) having a predetermined amplitude and a predetermined period (for example, ±15V) from a power source, which is not illustrated. Detailed description thereof will be given below.

As illustrated in FIG. 2, the wiring lines, liquid crystal drive electrodes, and coupling portions are provided on the front surface 2a of the transparent glass 23 of the array substrate 2. A coupling portion C1 of the array substrate 2 and a coupling portion C3 (refer to FIG. 3) of the counter substrate 3 are electrically coupled to each other through a common electrode (not illustrated) capable of conducting electricity. Similarly, a coupling portion C2 of the array substrate 2 and a coupling portion C4 (refer to FIG. 3) of the counter substrate 3 are electrically coupled to each other through a common electrode (not illustrated) capable of conducting electricity.

The first terminal 101 and the fifth terminal 201 are electrically coupled to each other through wiring lines (first wiring lines) 241, 242, and 243. The wiring line 241 extends from the first terminal 101 to the coupling portion C1. The wiring line 242 extends straight in the Y2 direction from the first terminal 101. The wiring line 243 extends straight in the X2 direction from an end of the wiring line 242 located in the Y2 direction and is coupled to the fifth terminal 201.

The second terminal 102 and the sixth terminal 202 are electrically coupled to each other through wiring lines (second wiring lines) 244 and 245. The wiring line 244 is coupled to the second terminal 102 and extends in the Y2 direction. The wiring line 245 extends in the X2 direction from an end of the wiring line 244 located in the Y2 direction and is coupled to the sixth terminal 202.

The third terminal 103 and the seventh terminal 203 are electrically coupled to each other through wiring lines (third wiring lines) 246, 247, and 240. The wiring line 246 is coupled to the third terminal 103 and extends in the X2 direction. The wiring line 247 extends in the Y2 direction from an end of the wiring line 246 located in the X2 direction and is coupled to the wiring line 240. The wiring line 240 is coupled to the seventh terminal 203.

The fourth terminal 104 and the eighth terminal 204 are electrically coupled to each other through wiring lines (fourth wiring lines) 248 and 249. The wiring line 248 extends straight from the fourth terminal 104 to the coupling portion C2. The wiring line 249 extends straight in the Y2 direction from the coupling portion C2 and is coupled to the eighth terminal 204.

Liquid crystal drive electrodes 261 are coupled to the wiring line 244. As illustrated in FIG. 2, seven liquid crystal drive electrodes 261 are provided in the present embodiment. Specifically, the seven liquid crystal drive electrodes 261 extend straight in the X2 direction from the wiring line 244. The seven liquid crystal drive electrodes 261 are disposed at equal intervals along the Y direction.

Liquid crystal drive electrodes 262 are coupled to the wiring line 247. As illustrated in FIG. 2, six liquid crystal drive electrodes 262 are provided in the present embodiment. Specifically, the six liquid crystal drive electrodes 262 extend straight in the X1 direction from the wiring line 247. The six liquid crystal drive electrodes 262 are disposed at equal intervals in the Y direction. The liquid crystal drive electrodes 261 and 262 are alternately arranged in the Y direction.

As illustrated in FIG. 3, wiring lines 340, 341, 342, and 343 and liquid crystal drive electrodes 361 and 362 are provided on the front surface 3a of the counter substrate 3.

The wiring line 340 extends straight in the Y2 direction from the coupling portion C3. The wiring line 341 extends straight in the X2 direction from an end of the wiring line 340 located in the Y2 direction.

The wiring line 342 is coupled to the coupling portion C4. The wiring line 343 is coupled to the wiring line 342 and extends straight in the X1 direction.

The liquid crystal drive electrodes 361 are coupled to the wiring line 341. As illustrated in FIG. 3, seven liquid crystal drive electrodes 361 are provided in the present embodiment. Specifically, the seven liquid crystal drive electrodes 361 extend straight in the Y1 direction from the wiring line 341. The seven liquid crystal drive electrodes 361 are disposed at equal intervals along the X direction.

The liquid crystal drive electrodes 362 are coupled to the wiring line 343. As illustrated in FIG. 3, six liquid crystal drive electrodes 362 are provided in the present embodiment. Specifically, the six liquid crystal drive electrodes 362 extend straight in the Y2 direction from the wiring line 343. The six liquid crystal drive electrodes 362 are disposed at equal intervals along the X direction. The liquid crystal drive electrodes 361 and 362 are alternately arranged in the X direction.

As illustrated in FIGS. 4 and 5, the light adjustment panel 1 includes the array substrate 2, the counter substrate 3 disposed above the array substrate 2 with a gap therebetween, and the liquid crystal layer 4 filling the gap between the array substrate 2 and the counter substrate 3. An alignment film is provided for wiring in the active region (refer to the active region 50 in FIG. 6 and other figures) but is omitted in the drawings. A cell gap as a distance between the front surface 2a of the array substrate 2 and the front surface 3a of the counter substrate 3 illustrated in FIG. 5 is preferably, for example, in a range of 10 micrometers (μm) to 50 micrometers (μm) inclusive.

As described above, in the first embodiment, the array substrate 2 and the counter substrate 3 have square shapes in plan view from above. As illustrated in FIG. 6, a central line CL1 is a straight line extending in the Y direction passing through a center C of the array substrate 2. A central line CL2 is a straight line extending in the X direction passing through the center C of the array substrate 2. The active region 50 illustrated in FIG. 1 is provided at a central part of a light adjustment device 100.

As illustrated in FIG. 6, the light adjustment device 100 according to the first embodiment includes a panel unit 110, flexible printed circuit boards 400 and 410, and a printed circuit board 500. The panel unit 110 includes a light adjustment panel (second light adjustment panel) 1B, and a light adjustment panel (first light adjustment panel) 1A stacked on the upper side of the light adjustment panel (second light adjustment panel) 1B. When the panel unit 110 is viewed from above, the first terminal group 10 of the light adjustment panel (first light adjustment panel) 1A and the second terminal group 20 of the light adjustment panel (second light adjustment panel) 1B are arranged in the X direction. When viewed from above, the flexible printed circuit board 400 led out from the light adjustment panel (first light adjustment panel) 1A and the flexible printed circuit board 410 led out from the light adjustment panel (second light adjustment panel) 1B are disposed at positions shifted from each other in the X direction and do not overlap with each other. Specifically, when viewed from above, the flexible printed circuit board 400 is disposed on the X1 side of the central line CL1, and the flexible printed circuit board 410 is disposed on the X2 side of the central line CL1. The flexible printed circuit boards 400 and 410 are electrically coupled to the printed circuit board 500. Detailed description thereof will be given below.

As illustrated in FIG. 7, the light adjustment panel (first light adjustment panel) 1A is disposed so that the first area 21 is positioned on the Y1 side as the lower side in FIG. 7. Specifically, the first terminal group 10 is disposed on the Y1 side serving as a front side of the light adjustment panel (first light adjustment panel) 1A and on the X1 side of the central line CL1. The flexible printed circuit board 400 is electrically coupled to the first terminal 101, the second terminal 102, the third terminal 103, and the fourth terminal 104 included in the first terminal group 10. The flexible printed circuit board 400 extends in the Y1 direction. The flexible printed circuit board 400 is disposed on the X1 side of the central line CL1.

As illustrated in FIG. 8, disposition of the light adjustment panel 1B is the same as disposition of the light adjustment panel 1A being rotated by 90 degrees clockwise about the center C. In other words, the light adjustment panel 1B is disposed so that the second area 22 is positioned on the Y1 side as the lower side in FIG. 8. Thus, the second terminal group 20 is disposed on the Y1 side serving as a front side of the light adjustment panel 1B and on the X2 side of the central line CL2. The flexible printed circuit board 410 is electrically coupled to the fifth terminal 201, the sixth terminal 202, the seventh terminal 203, and the eighth terminal 204 included in the second terminal group 20. The flexible printed circuit board 410 extends in the Y1 direction. The flexible printed circuit board 410 is disposed on the X2 side of the central line CL2.

As described above, the light adjustment device 100 according to the first embodiment includes: the panel unit 110 in which a plurality of light adjustment panels (the light adjustment panel 1B and the light adjustment panel 1A) are stacked in the up-down direction (first direction), the light adjustment panels each including the array substrate (first substrate) 2 and the counter substrate (second substrate) 3, the array substrate 2 including the first terminal group 10 and the second terminal group 20; and the flexible printed circuit boards 400 and 410 each of which is coupled to one of the first terminal group 10 and the second terminal group 20 of a corresponding one of the light adjustment panels 1A and 1B. When the panel unit 110 is viewed from above, the first terminal group 10 and the second terminal group 20 are arranged in the X direction, and a plurality of the flexible printed circuit boards 400 and 410 do not overlap with one another.

Thus, the flexible printed circuit boards 400 and 410 can be coupled to the one printed circuit board 500. That is, the two light adjustment panels (the light adjustment panel 1B and the light adjustment panel 1A) stacked in the up-down direction are coupled to the one printed circuit board 500 through the flexible printed circuit boards 400 and 410, and thus the number of coupled printed circuit boards can be reduced. According to the present embodiment, the number of components of the light adjustment device 100 is reduced, and cost can be reduced as well.

The first terminal 101, the second terminal 102, the third terminal 103, and the fourth terminal 104 included in the first terminal group 10 are electrically coupled to the fifth terminal 201, the sixth terminal 202, the seventh terminal 203, and the eighth terminal 204 included in the second terminal group 20, respectively. This configuration allows the flexible printed circuit boards 400 and 410 to be coupled to any of the first terminal group 10 and the second terminal group 20. Consequently, in the panel unit 110 in which the light adjustment panel 1B and the light adjustment panel 1A are stacked in the up-down direction, the second terminal group 20 of the light adjustment panel 1B and the first terminal group 10 of the light adjustment panel 1A can be arranged in the right-left direction (X direction) in FIG. 6 by changing the orientation of the light adjustment panel 1B or the light adjustment panel 1A as illustrated in FIG. 6. Thus, the flexible printed circuit boards 400 and 410 can be led out in the same direction and coupled to the one printed circuit board 500.

The array substrate (first substrate) 2 has a rectangular shape including the first area (first side) 21 and the second area (second side) 22. The first area (first side) 21 of the array substrate (first substrate) 2 of the light adjustment panel (first light adjustment panel) 1A illustrated in FIG. 7 extends along the X direction (second direction). The second area (second side) 22 of the array substrate (first substrate) 2 of the light adjustment panel (second light adjustment panel) 1B illustrated in FIG. 8 extends along the X direction (second direction). The first terminal group 10 is disposed in the first area (first side) 21, and the second terminal group 20 is disposed in the second area (second side) 22.

With this configuration, the second terminal group 20 of the light adjustment panel 1B and the first terminal group 10 of the light adjustment panel 1A can be arranged along the right-left direction (X direction) in FIG. 6 by simple work of rotating the light adjustment panel 1A having the same structure as that of the light adjustment panel 1B by 90 degrees clockwise about the center C.

The wiring lines (first wiring lines) 241, 242, and 243 and the wiring lines (fourth wiring lines) 248 and 249 of the array substrate (first substrate) 2 are electrically coupled to wiring lines of the counter substrate (second substrate) 3 through the common electrodes. Thus, with such a simple structure, conduction can be provided between the wiring of the array substrate (first substrate) 2 and the wiring of the counter substrate (second substrate) 3.

Second Embodiment

Figure 9:
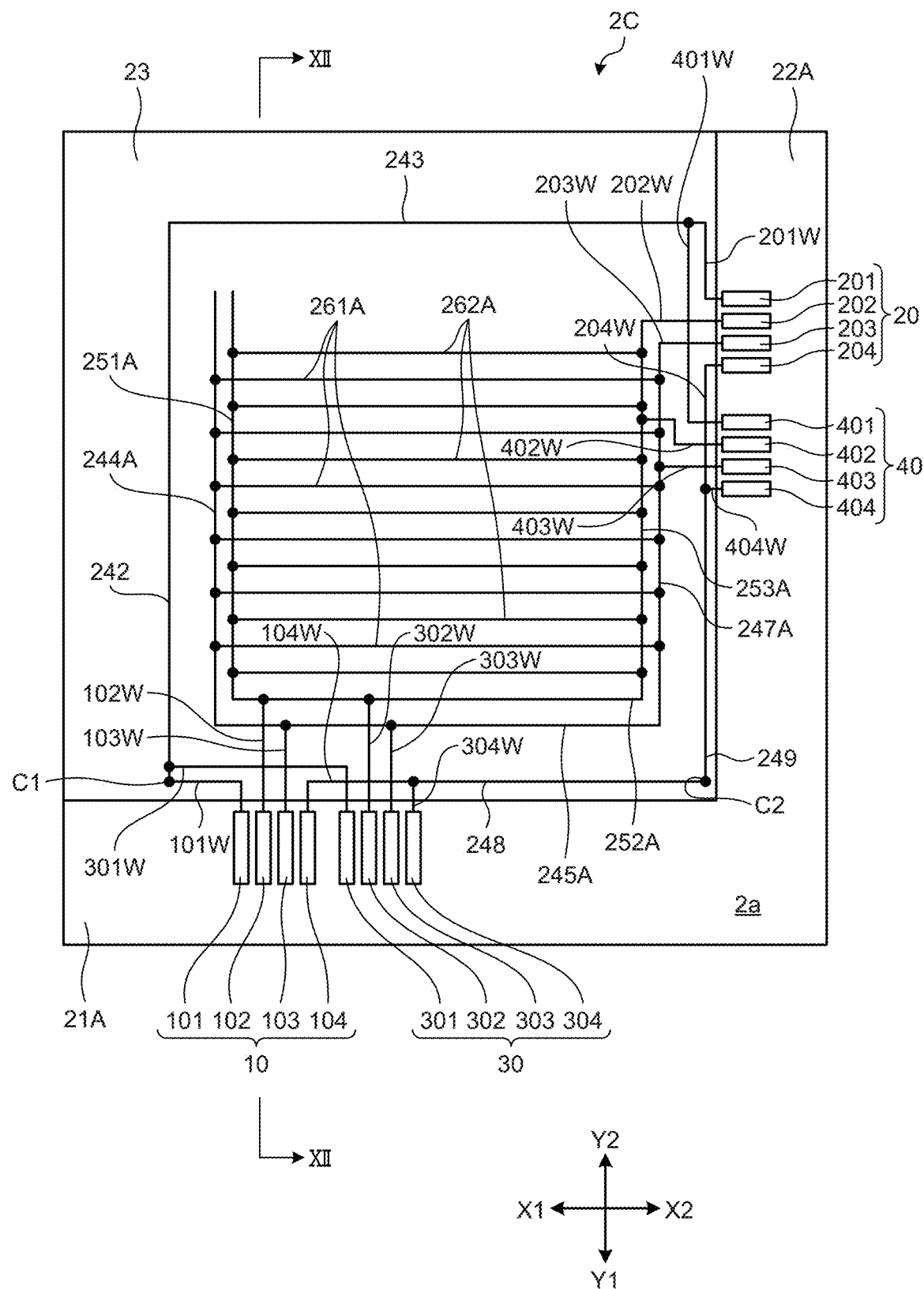
FIG. 9 is a schematic diagram of an array substrate according to a second embodiment when viewed from above.
Figure 11:
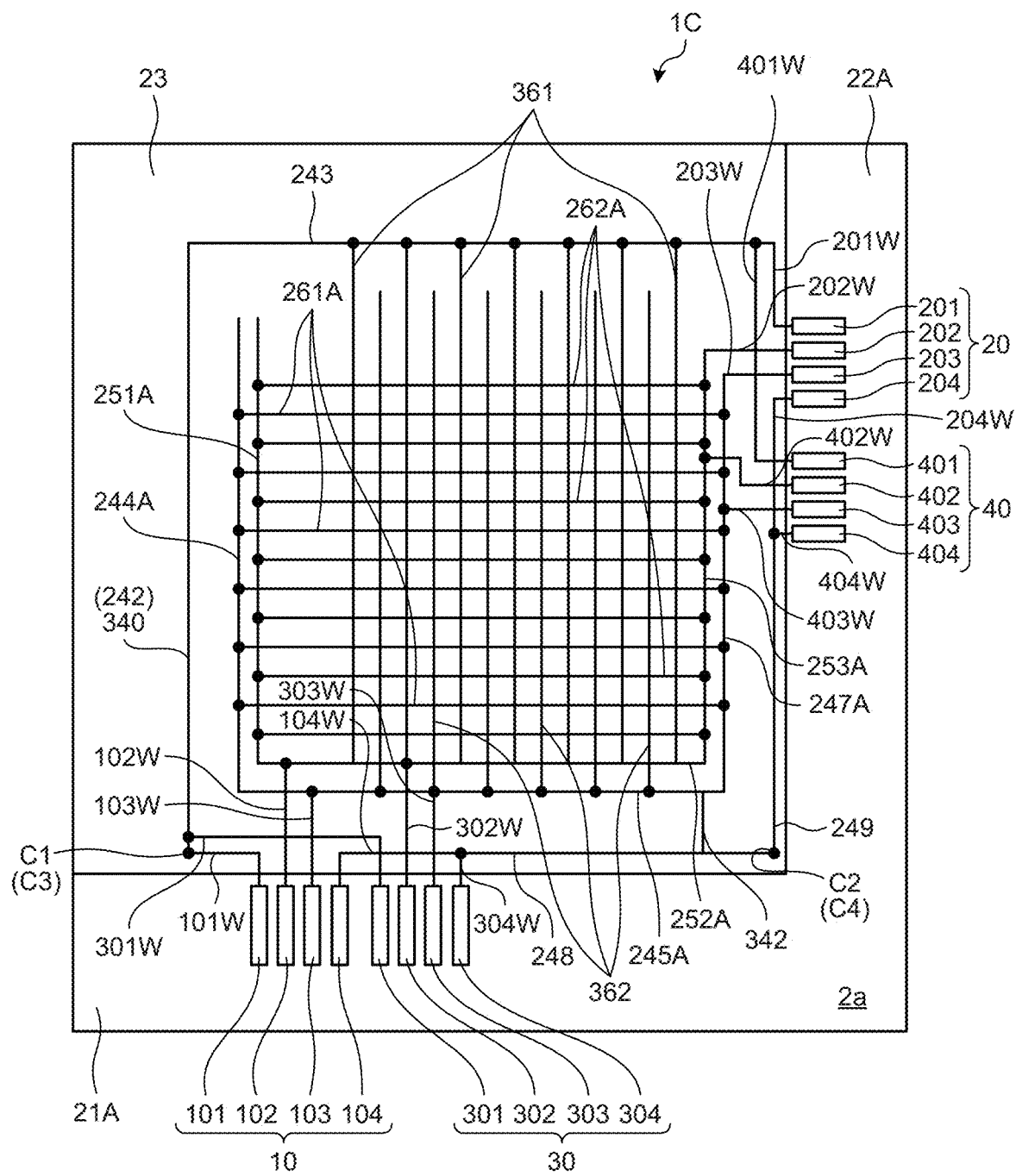
FIG. 11 is a schematic diagram of a light adjustment panel according to the second embodiment when viewed from above.
Figure 12:
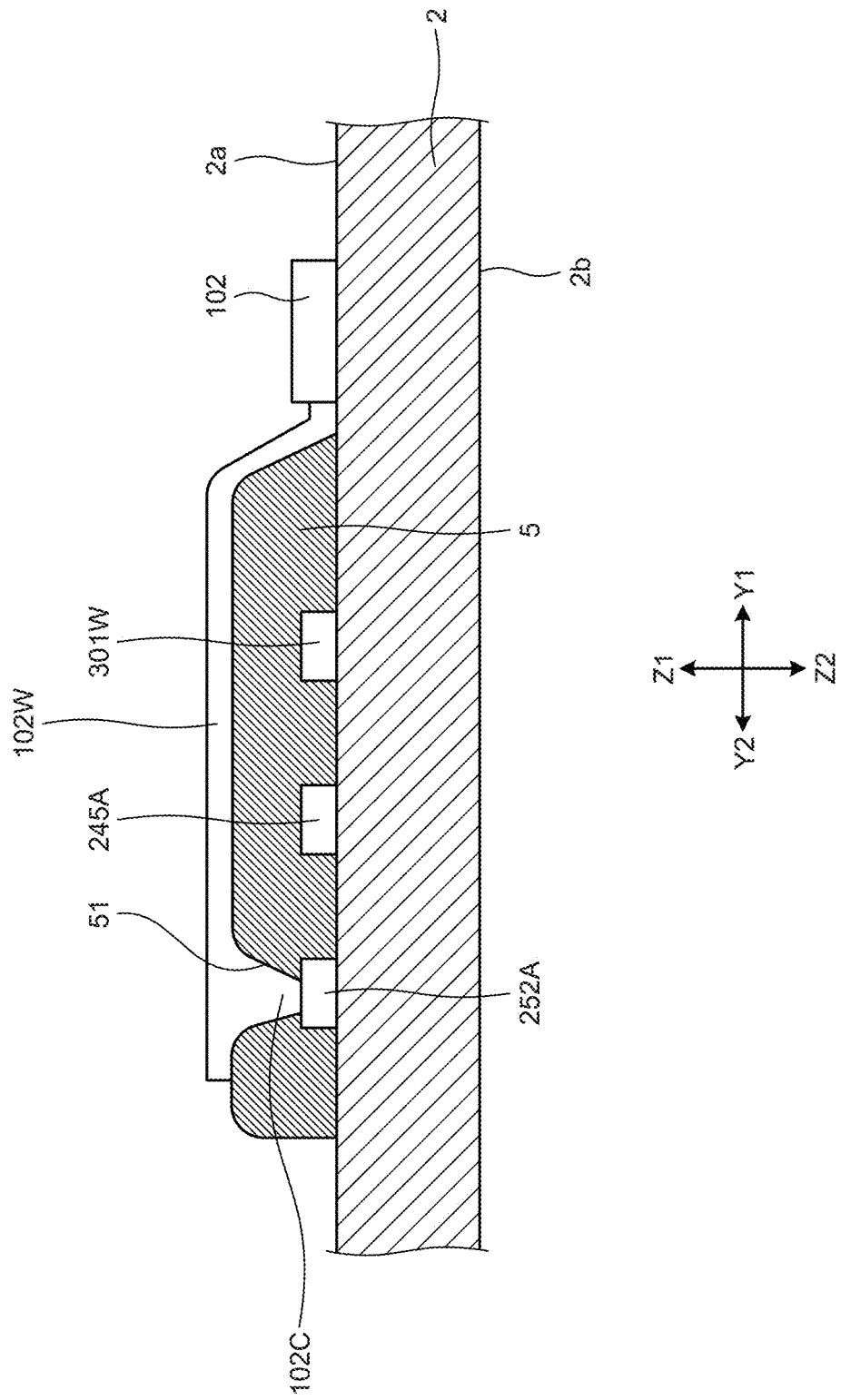
FIG. 12 is a sectional view taken along line XII-XII in FIG. 9.

Next, a second embodiment will be described below. FIG. 9 is a schematic diagram of an array substrate according to the second embodiment when viewed from above. FIG. 10 is a schematic diagram of a counter substrate according to the second embodiment when viewed from above. FIG. 11 is a schematic diagram of a light adjustment panel according to the second embodiment when viewed from above. FIG. 12 is a sectional view taken along line XII-XII in FIG. 9. In the second embodiment, an insulating layer is provided because the array substrate (first substrate) 2 includes a part where wiring lines overlap as described later with reference to FIG. 12.

As illustrated in FIG. 9, wiring lines, liquid crystal drive electrodes, and coupling portions are provided on the front surface 2a of the transparent glass 23 of an array substrate (first substrate) 2C.

First, the first terminal group 10 will be described below. As illustrated in FIG. 9, the first terminal 101 and the fifth terminal 201 are electrically coupled to each other through wiring lines 101W, 242, 243, and 201W. The wiring line 101W extends from the first terminal 101 to the coupling portion C1. The wiring line 242 extends straight in the Y2 direction from the coupling portion C1. The wiring line 243 extends straight in the X2 direction from the end of the wiring line 242 located in the Y2 direction. The wiring line 201W extends from an end of the wiring line 243 located in the X2 direction to the fifth terminal 201.

A wiring line 102W extends in the Y2 direction from the second terminal 102. The wiring line 102W is coupled to a wiring line 252A. The wiring line 252A extends straight in the X direction. A wiring line 251A extends in the Y2 direction from an end of the wiring line 252A located in the X1 direction. A wiring line 253A extends in the Y2 direction from an end of the wiring line 252A located in the X2 direction.

A wiring line 103W extends in the Y2 direction from the third terminal 103. The wiring line 103W is coupled to a wiring line 245A. The wiring line 245A extends straight in the X direction. A wiring line 244A extends in the Y2 direction from an end of the wiring line 245A located in the X1 direction. A wiring line 247A extends in the Y2 direction from an end of the wiring line 245A located in the X2 direction.

A wiring line 104W extends from the fourth terminal 104. The wiring line 104W is coupled to the wiring line 248. The wiring line 248 extends to the coupling portion C2. The wiring line 249 extends in the Y2 direction from the coupling portion C2. The wiring line 249 is coupled to a wiring line 204W. The wiring line 204W is coupled to the eighth terminal 204.

Next, a third terminal group 30 will be described below. The third terminal group (terminal unit) 30 includes a ninth terminal 301, a tenth terminal 302, an eleventh terminal 303, and a twelfth terminal 304. The third terminal group (terminal unit) 30 is disposed on the X2 side of the first terminal group (terminal unit) 10.

A wiring line 301W extends from the ninth terminal 301. The wiring line 301W is coupled to the wiring line 242. A wiring line 302W extends from the tenth terminal 302. The wiring line 302W is coupled to the wiring line 252A. A wiring line 303W extends from the eleventh terminal 303. The wiring line 303W is coupled to the wiring line 245A. A wiring line 304W extends from the twelfth terminal 304. The wiring line 304W is coupled to the wiring line 248.

Next, the second terminal group 20 will be described below. A wiring line 202W extends from the sixth terminal 202. The wiring line 202W is coupled to the wiring line 253A. A wiring line 203W extends from the seventh terminal 203. The wiring line 203W is coupled to the wiring line 247A. The wiring line 204W extends from the eighth terminal 204. The wiring line 204W is coupled to the wiring line 249.

Next, a fourth terminal group 40 will be described below. The fourth terminal group (terminal unit) 40 includes a thirteenth terminal 401, a fourteenth terminal 402, a fifteenth terminal 403, and a sixteenth terminal 404. The fourth terminal group (terminal unit) 40 is disposed on the Y1 side of the second terminal group (terminal unit) 20.

A wiring line 401W extends from the thirteenth terminal 401. The wiring line 401W is coupled to the wiring line 243. A wiring line 402W extends from the fourteenth terminal 402. The wiring line 402W is coupled to the wiring line 253A. A wiring line 403W extends from the fifteenth terminal 403. The wiring line 403W is coupled to the wiring line 247A. A wiring line 404W extends from the sixteenth terminal 404. The wiring line 404W is coupled to the wiring line 249.

Next, liquid crystal drive electrodes will be described below. As illustrated in FIG. 9, liquid crystal drive electrodes 261A couple the wiring line 244A and the wiring line 247A. As illustrated in FIG. 9, six liquid crystal drive electrodes 261A are provided in the present embodiment. Specifically, the six liquid crystal drive electrodes 261A extend straight in the X2 direction from the wiring line 244A to the wiring line 247A. The six liquid crystal drive electrodes 261A are disposed at equal intervals along the Y direction.

Liquid crystal drive electrodes 262A couple the wiring line 251A and the wiring line 253A. As illustrated in FIG. 9, seven liquid crystal drive electrodes 262A are provided in the present embodiment. Specifically, the seven liquid crystal drive electrodes 262A extend straight in the X2 direction from the wiring line 251A to the wiring line 253A. The seven liquid crystal drive electrodes 262A are disposed at equal intervals along the Y direction. The liquid crystal drive electrodes 261A and 262A are alternately arranged in the Y direction.

Next, an insulating layer 5 will be described below. As illustrated in FIG. 12, the second terminal 102 is provided on the front surface 2a of the array substrate 2C. The wiring lines 301W, 245A, and 252A are also routed on the front surface 2a of the array substrate 2C. The wiring lines 301W, 245A, and 252A are disposed at intervals from the Y1 side toward the Y2 side. The wiring line 102W extends in the Y2 direction from the second terminal 102. The wiring line 102W is coupled to the upper surface of the wiring line 252A through the upper side (Z1 side) of the wiring lines 301W and 245A. At the section in FIG. 12, the insulating layer 5 is provided between the wiring line 102W and the wiring lines 301W and 245A. The insulating layer 5 is provided with a through-hole 51. A protruding portion 102C protrudes downward at an end part of the wiring line 102W and is disposed on the inner periphery side of the through-hole 51. The protruding portion 102C is coupled to the wiring line 252A. The insulating layer 5 is provided at least at a portion where two wiring lines overlap but may be provided on the entire surface of the array substrate 2C.

A first light adjustment panel 1C illustrated in FIG. 11 includes the array substrate 2C in FIG. 9, the counter substrate 3 in FIG. 10 disposed on the upper side of the array substrate 2C with a gap therebetween, and the liquid crystal layer 4 (refer to FIG. 5) filling the gap between the array substrate 2C and the counter substrate 3.

Figure 13:
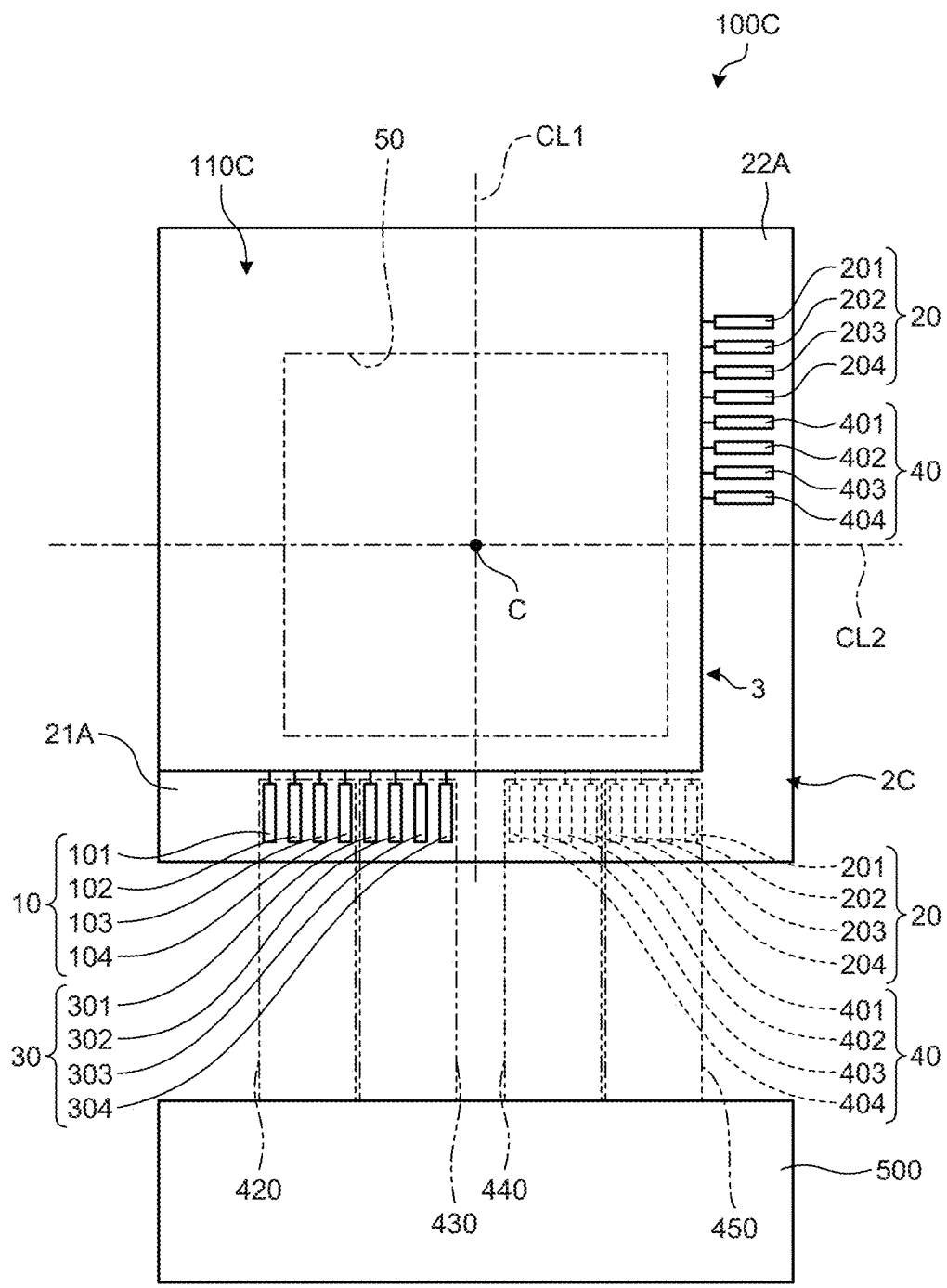
FIG. 13 is a schematic diagram of a light adjustment device according to the second embodiment when viewed from above.
Figure 14:
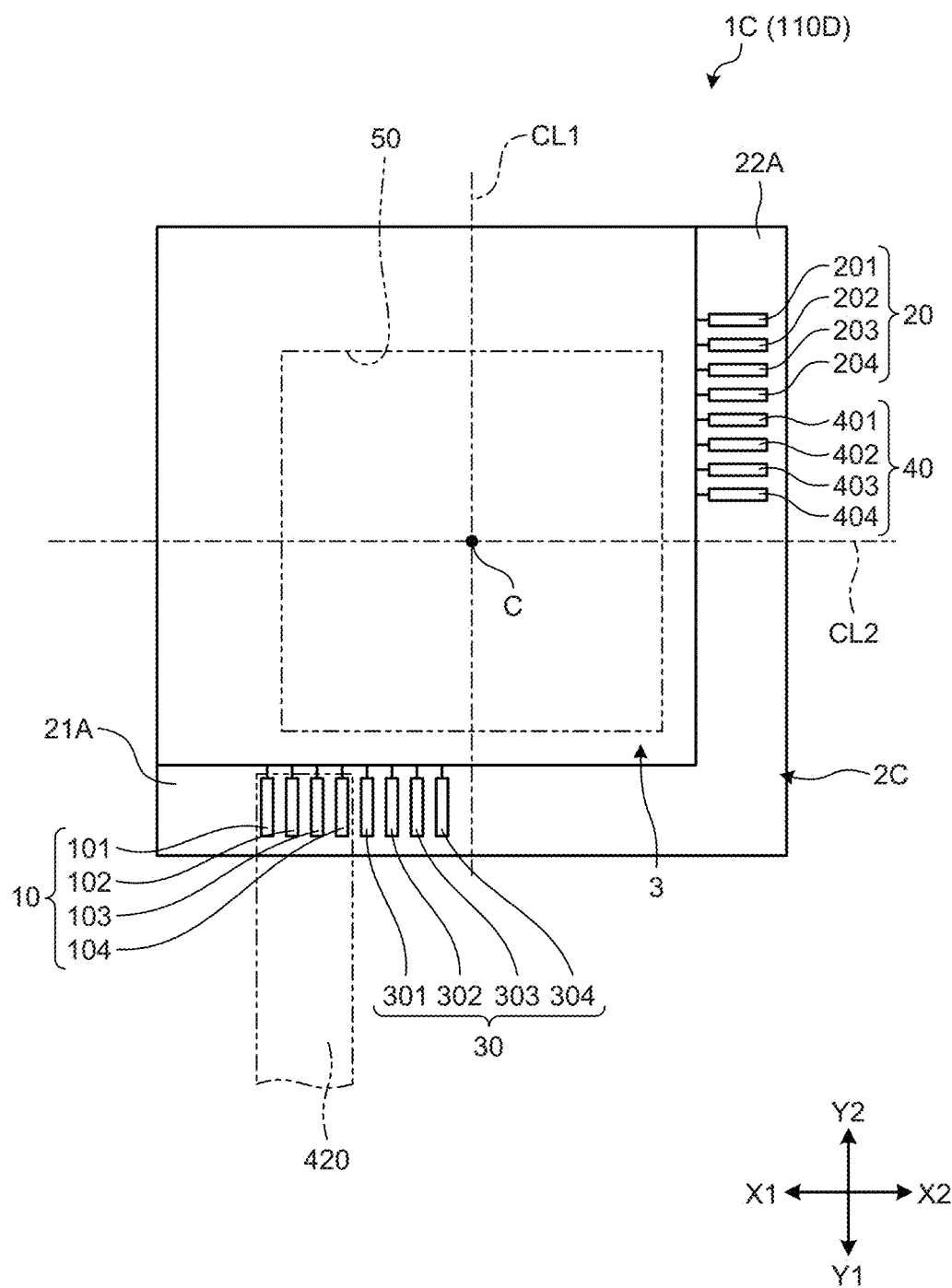
FIG. 14 is a schematic diagram of a light adjustment panel stacked first on the upper side in the light adjustment device in FIG. 13 when viewed from above.
Figure 15:
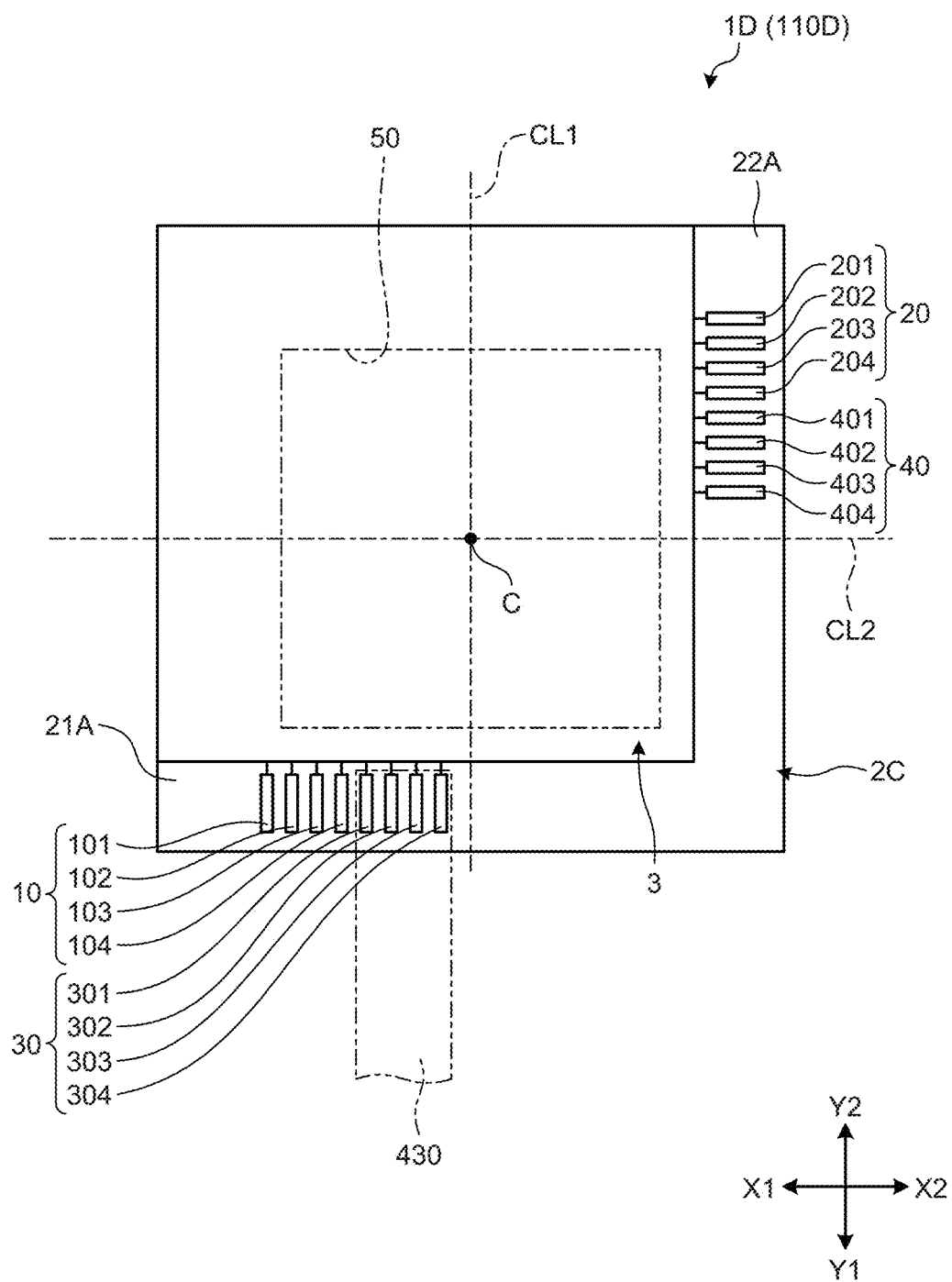
FIG. 15 is a schematic diagram of a light adjustment panel stacked second on the upper side in the light adjustment device in FIG. 13 when viewed from above.
Figure 16:
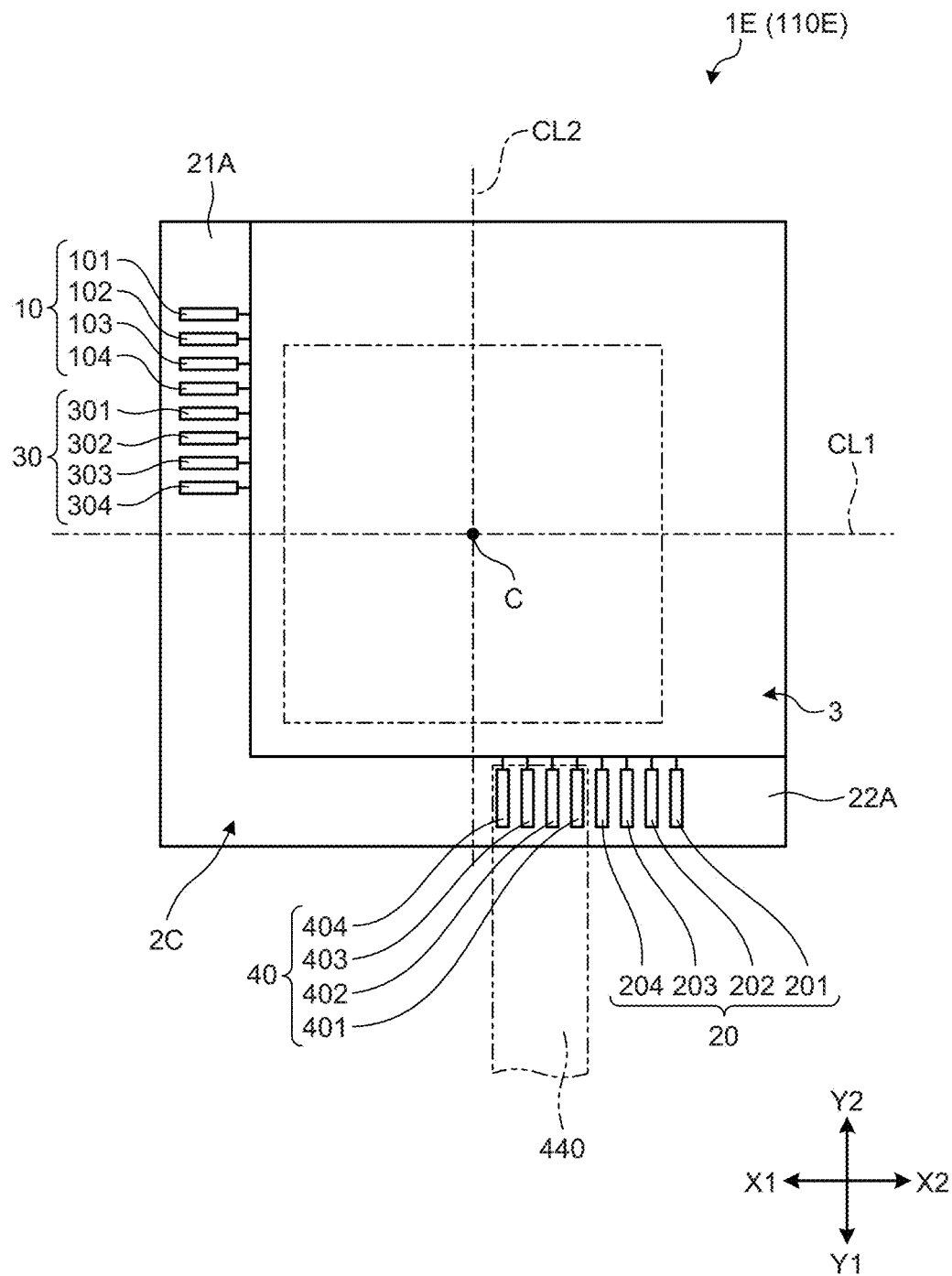
FIG. 16 is a schematic diagram of a light adjustment panel stacked third on the upper side in the light adjustment device in FIG. 13 when viewed from above.

Next, a flexible printed circuit board attached to a light adjustment panel will be described below. FIG. 13 is a schematic diagram of a light adjustment device according to the second embodiment when viewed from above. FIG. 14 is a schematic diagram of a light adjustment panel stacked first on the upper side in the light adjustment device in FIG. 13 when viewed from above. FIG. 15 is a schematic diagram of a light adjustment panel stacked second on the upper side in the light adjustment device in FIG. 13 when viewed from above. FIG. 16 is a schematic diagram of a light adjustment panel stacked third on the upper side in the light adjustment device in FIG. 13 when viewed from above. FIG. 17 is a schematic diagram of a light adjustment panel stacked fourth on the upper side when viewed from above in the light adjustment device in FIG. 13.

A light adjustment device 100C illustrated in FIG. 13 includes a panel unit 110C, flexible printed circuit boards 420, 430, 440, and 450, and the printed circuit board 500. That is, four flexible printed circuit boards 420, 430, 440, and 450 are electrically coupled to the light adjustment device 100C. The four flexible printed circuit boards 420, 430, 440, and 450 are disposed at positions shifted from one another in the X direction and do not overlap with one another when the light adjustment device 100C is viewed from above. The flexible printed circuit boards 420 and 430 are positioned on the X1 side of the central line CL1, and the flexible printed circuit boards 440 and 450 are positioned on the X2 side of the central line CL1. The four flexible printed circuit boards 420, 430, 440, and 450 are electrically coupled to the one printed circuit board 500. Detailed description thereof will be given below.

The panel unit 110C includes a first unit 110D and a second unit 110E. The first unit 110D includes the first light adjustment panel 1C illustrated in FIG. 14 and a second light adjustment panel 1D illustrated in FIG. 15. The first light adjustment panel 1C is stacked on the upper side of the second light adjustment panel 1D.

As illustrated in FIG. 14, the first light adjustment panel 1C includes the array substrate 2C and the counter substrate 3. In the array substrate 2C, a first area (first side) 21A is disposed on the Y1 side as the lower side in FIG. 14, and a second area (second side) 22A is disposed on the X2 side in FIG. 14. The first area (first side) 21A extends along the X direction (second direction).

The first terminal group 10 and the third terminal group 30 are provided in the first area (first side) 21A. The first terminal group 10 and the third terminal group 30 are arranged along the X direction. The first terminal group 10 and the third terminal group 30 are disposed on the Y1 side and on the X1 side of the central line CL1 in the first light adjustment panel 1C. The third terminal group 30 is disposed on the X2 side of the first terminal group 10. The third terminal group 30 includes the ninth terminal 301, the tenth terminal 302, the eleventh terminal 303, and the twelfth terminal 304.

The second terminal group 20 and the fourth terminal group 40 are provided in the second area (second side) 22A. The second terminal group 20 and the fourth terminal group 40 are arranged along the Y direction. The second terminal group 20 and the fourth terminal group 40 are disposed on the X2 side and on the Y2 side of the central line CL2 in the first light adjustment panel 1C. The fourth terminal group 40 is disposed on the Y1 side of the second terminal group 20. The fourth terminal group 40 includes the thirteenth terminal 401, the fourteenth terminal 402, the fifteenth terminal 403, and the sixteenth terminal 404.

As illustrated in FIG. 14, the flexible printed circuit board 420 is electrically coupled to the first terminal 101, the second terminal 102, the third terminal 103, and the fourth terminal 104 included in the first terminal group 10. The flexible printed circuit board 420 extends in the Y1 direction. The flexible printed circuit board 420 is disposed on the X1 side of the central line CL1.

As illustrated in FIG. 15, the second light adjustment panel 1D has the same configuration as that of the first light adjustment panel 1C. The first area (first side) 21A extends along the X direction (second direction). The flexible printed circuit board 430 is electrically coupled to the ninth terminal 301, the tenth terminal 302, the eleventh terminal 303, and the twelfth terminal 304 included in the third terminal group 30. The flexible printed circuit board 430 extends in the Y1 direction. The flexible printed circuit board 430 is disposed on the X1 side of the central line CL1.

The second unit 110E includes a third light adjustment panel 1E illustrated in FIG. 16 and a fourth light adjustment panel 1F illustrated in FIG. 17. As illustrated in FIG. 16, disposition of the third light adjustment panel 1E is the same as disposition of the first light adjustment panel 1C or the second light adjustment panel 1D being rotated by 90 degrees clockwise about the center C. Specifically, in the third light adjustment panel 1E, the second area 22A is disposed on the Y1 side as the lower side in FIG. 16. In other words, the fourth terminal group 40 is disposed on the Y1 side serving as a front side of the third light adjustment panel 1E and on the X2 side of the central line CL2. The second area (second side) 22A extends along the X direction (second direction). The flexible printed circuit board 440 is electrically coupled to the thirteenth terminal 401, the fourteenth terminal 402, the fifteenth terminal 403, and the sixteenth terminal 404 included in the fourth terminal group 40. The flexible printed circuit board 440 extends in the Y1 direction. The flexible printed circuit board 440 is disposed on the X2 side of the central line CL2.

As illustrated in FIG. 17, disposition of the fourth light adjustment panel 1F is the same as that of the third light adjustment panel 1E. The second area (second side) 22A extends along the X direction (second direction). The flexible printed circuit board 450 is electrically coupled to the fifth terminal 201, the sixth terminal 202, the seventh terminal 203, and the eighth terminal 204 included in the second terminal group 20. The flexible printed circuit board 450 extends in the Y1 direction. The flexible printed circuit board 450 is disposed on the X2 side of the central line CL2.

As described above, the light adjustment device 100C according to the second embodiment includes the panel unit 110C, and the panel unit 110C includes the first unit 110D and the second unit 110E. The first unit 110D includes the first light adjustment panel 1C and the second light adjustment panel 1D adjacent to each other in the up-down direction. The second unit 110E includes the third light adjustment panel 1E and the fourth light adjustment panel 1F adjacent to each other in the up-down direction. In each of the first light adjustment panel 1C and the second light adjustment panel 1D, the first area (first side) 21A extends along the X direction (second direction). In each of the third light adjustment panel 1E and the fourth light adjustment panel 1F, the second area (second side) 22A extends along the X direction (second direction).

Thus, in the second embodiment as well, the flexible printed circuit boards 420, 430, 440, and 450 can be coupled to the one printed circuit board 500. Specifically, the four light adjustment panels (the first light adjustment panel 1C, the second light adjustment panel 1D, the third light adjustment panel 1E, and the fourth light adjustment panel 1F) stacked in the up-down direction are coupled to the one printed circuit board 500 through the flexible printed circuit boards 420, 430, 440, and 450, whereby the number of components of the light adjustment device 100C is reduced, and thus cost can be reduced.

What is claimed is:
1. A light adjustment device comprising:
a panel unit in which a plurality of light adjustment panels are stacked in a first direction, the light adjustment panels each including a first substrate and a second substrate, the first substrate including at least two terminal groups each including a plurality of terminals that are capable of being coupled to one flexible printed circuit board, the second substrate overlapping with the first substrate; and
a plurality of flexible printed circuit boards each of which is coupled to one of the terminal groups of a corresponding one of the light adjustment panels,
wherein a plurality of the terminal groups are arranged in a second direction intersecting the first direction when the panel unit is viewed in the first direction,
wherein the flexible printed circuit boards do not overlap with one another when viewed in the first direction,
wherein the first substrate has a rectangular shape including a first side and a second side intersecting the first side, and each of the terminal groups is provided at a corresponding one of the first side and the second side,
wherein the light adjustment panels include a first light adjustment panel and a second light adjustment panel adjacent to each other in the first direction, and wherein the first side of the first substrate of the first light adjustment panel extends along the second direction, and the second side of the first substrate of the second light adjustment panel extends along the second direction.

2. The light adjustment device according to claim 1,
wherein the terminals included in one of the at least two terminal groups provided to the first substrate are electrically coupled to the terminals included in another terminal group, respectively.

3. A light adjustment device comprising:
a panel unit in which a plurality of light adjustment panels are stacked in a first direction, the light adjustment panels each including a first substrate and a second substrate, the first substrate including at least two terminal groups each including a plurality of terminals that are capable of being coupled to one flexible printed circuit board, the second substrate overlapping with the first substrate; and
a plurality of flexible printed circuit boards each of which is coupled to one of the terminal groups of a corresponding one of the light adjustment panels,
wherein a plurality of the terminal groups are arranged in a second direction intersecting the first direction when the panel unit is viewed in the first direction,
wherein the flexible printed circuit boards do not overlap with one another when viewed in the first direction,
wherein the first substrate has a rectangular shape including a first side and a second side intersecting the first side, and each of the terminal groups is provided at a corresponding one of the first side and the second side,
wherein the panel unit includes
a first unit including a first light adjustment panel and a second light adjustment panel adjacent to each other in the first direction, and
a second unit stacked on or above the first unit and including a third light adjustment panel and a fourth light adjustment panel adjacent to each other in the first direction,
wherein the first side of the first substrate of each of the first light adjustment panel and the second light adjustment panel extends along the second direction, and
wherein the second side of the first substrate of each of the third light adjustment panel and the fourth light adjustment panel extends along the second direction.

4. The light adjustment device according to claim 1,
wherein each of the light adjustment panels includes a liquid crystal layer between the first substrate and the second substrate.

5. The light adjustment device according to claim 1,
wherein each first substrate includes a first terminal group and a second terminal group, and
wherein the first terminal group is provided on the first side, and the second terminal group is provided on the second side.

6. The light adjustment device according to claim 5,
wherein the first terminal group includes a first terminal, a second terminal, a third terminal, and a fourth terminal,
wherein the second terminal group includes a fifth terminal, a sixth terminal, a seventh terminal, and an eighth terminal,
wherein the first terminal and the fifth terminal are electrically coupled to each other through a first wiring line,
wherein the second terminal and the sixth terminal are electrically coupled to each other through a second wiring line,
wherein the third terminal and the seventh terminal are electrically coupled to each other through a third wiring line,
wherein the fourth terminal and the eighth terminal are electrically coupled to each other through a fourth wiring line, and
wherein each of the second wiring line and the third wiring line is coupled to a liquid crystal drive electrode.

7. The light adjustment device according to claim 6,
wherein the first wiring line and the fourth wiring line of each first substrate are electrically coupled, through a common electrode, to wiring lines of the second substrate stacked on or above the first substrate.

8. The light adjustment device according to claim 3,
wherein each first substrate includes a first terminal group and a second terminal group, and
wherein the first terminal group is provided on the first side, and the second terminal group is provided on the second side.

9. The light adjustment device according to claim 8,
wherein the first terminal group includes a first terminal, a second terminal, a third terminal, and a fourth terminal,
wherein the second terminal group includes a fifth terminal, a sixth terminal, a seventh terminal, and an eighth terminal,
wherein the first terminal and the fifth terminal are electrically coupled to each other through a first wiring line,
wherein the second terminal and the sixth terminal are electrically coupled to each other through a second wiring line,
wherein the third terminal and the seventh terminal are electrically coupled to each other through a third wiring line,
wherein the fourth terminal and the eighth terminal are electrically coupled to each other through a fourth wiring line, and
wherein each of the second wiring line and the third wiring line is coupled to a liquid crystal drive electrode.

10. The light adjustment device according to claim 9,
wherein the first wiring line and the fourth wiring line of each first substrate are electrically coupled, through a common electrode, to wiring lines of the second substrate stacked on or above the first substrate.

11. The light adjustment device according to claim 3,
wherein the terminals included in one of the at least two terminal groups provided to the first substrate are electrically coupled to the terminals included in another terminal group, respectively.

12. The light adjustment device according to claim 3,
wherein each of the light adjustment panels includes a liquid crystal layer between the first substrate and the second substrate.

* * * * *